United States Patent
Cai et al.

(10) Patent No.: US 10,097,439 B1
(45) Date of Patent: Oct. 9, 2018

(54) MOBILE COMMUNICATION DEVICE SELF-TESTING

(71) Applicant: Sprint Communications Company L.P., Overland Park, KS (US)

(72) Inventors: Zheng Cai, Fairfax, VA (US); Zheng Fang, McLean, VA (US); Yu Wang, Fairfax, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 72 days.

(21) Appl. No.: 15/365,936

(22) Filed: Nov. 30, 2016

(51) Int. Cl.
*H04L 12/26* (2006.01)
*H04W 4/02* (2018.01)
*H04W 72/04* (2009.01)
*H04L 5/00* (2006.01)

(52) U.S. Cl.
CPC .......... *H04L 43/0888* (2013.01); *H04L 5/006* (2013.01); *H04W 4/025* (2013.01); *H04W 72/042* (2013.01); *H04W 72/0413* (2013.01)

(58) Field of Classification Search
None
See application file for complete search history.

(56) References Cited

U.S. PATENT DOCUMENTS

| | | | | |
|---|---|---|---|---|
| 2004/0155772 A1* | 8/2004 | Medema | ............... | H04W 64/00 340/539.12 |
| 2005/0114504 A1* | 5/2005 | Marolia | .................. | H04M 1/24 709/224 |
| 2014/0040455 A1* | 2/2014 | Farahat | ............... | H04L 67/2804 709/224 |
| 2015/0382208 A1* | 12/2015 | Elliott | ................... | H04W 24/02 370/252 |
| 2016/0112449 A1* | 4/2016 | Toyama | .............. | H04L 63/1425 726/23 |

\* cited by examiner

*Primary Examiner* — Kevin C Harper
*Assistant Examiner* — Derrick V Rose (57) ABSTRACT

A mobile communication device that performs self-testing. The device comprises a radio transceiver, a non-transitory memory, a processor, and a self-testing application stored in the non-transitory memory. When executed by the processor the self-testing application determines a location of the device, after determining the device location and within a predefined period of time, establishes a communication session via the radio transceiver with a self-test analysis server, and receives a self-test manifest from the self-test analysis server, where the self-test manifest identifies a self-test. The application further performs the self-test identified by the manifest, logs results of the self-test, stores the logged results in a memory of the device, transmits the logged results and the location of the device to the self-test analysis server, after transmitting the logged results and location of the mobile communication device, deletes the logged results from the mobile communication device, and closes the communication session.

20 Claims, 9 Drawing Sheets

MOBILE COMMUNICATION DEVICE SELF-TESTING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices provide both voice call and data communication service to users in locations all over the United States. To some extent, users have become dependent on their mobile communication devices and expect them to provide a high standard of communication quality and to have high availability. Meeting these user expectations can be a challenge, given the large number of involved cell sites used to provide wireless coverage and the large number of ever changing device models the radio access network is called upon to support.

SUMMARY

In an embodiment, a method of a mobile communication device performing self-testing is disclosed. The method comprises determining a location of a mobile communication device by the mobile device, after determining the mobile communication device location and within a predefined period of time of determining the mobile device location, establishing by the mobile communication device a communication session with a self-test analysis server, receiving a self-test manifest by the mobile communication device via the communication session from the self-test analysis server, where the self-test manifest identifies a self-test to be performed by the mobile communication device and where the self-test manifest is created by a server computer based on performance norms determined by the server computer based on analyzing logged self-test results collected from other mobile communication devices and based on logged self-test results previously collected from the mobile communication device, and performing the self-test identified by the manifest by the mobile communication device. The method further comprises logging results of the self-test by the mobile communication device, transmitting the logged results and the location of the mobile communication device by the mobile communication device via the communication session to the self-test analysis server, after transmitting the logged results and location of the mobile communication device, deleting the logged results from the mobile communication device by the mobile communication device, and closing the communication session by the mobile communication device, whereby a remedial action is identified and performed.

In another embodiment, a mobile communication device that performs self-testing is disclosed. The mobile communication device comprises a radio transceiver, a non-transitory memory, a processor, and a self-testing application stored in the non-transitory memory. When executed by the processor the self-testing application establishes a communication session via the radio transceiver with a self-test analysis server, receives a self-test manifest via the communication session from the self-test analysis server, where the self-test manifest identifies a self-test to be performed by the mobile communication device, performs the self-test identified by the manifest, and logs results of the self-test. The self-test application further transmits the logged results via the communication session to the self-test analysis server, closes the communication session. After closing the communication session, the self-test application further attempts to establish a second communication session via the radio transmitter with the self-test analysis server, logs a failure to establish the second communication session, after logging the failure to establish the second communication session and after delaying a predefined duration of time since the failure, establishes a third communication session via the radio transceiver with the self-analysis server, and transmits the logged failure to the self-analysis server via the third communication session, whereby the self-test analysis server is able to take corrective action to improve wireless communication service to the mobile communication device based both on transmitted logged results and based on the transmitted logged failure.

In yet another embodiment, a method of performing mobile communication active troubleshooting is disclosed. The method comprises establishing by the mobile communication device a first communication session with a self-test analysis server, receiving a first self-test manifest by the mobile communication device via the first communication session from the self-test analysis server, where the first self-test manifest identifies a first self-test to be performed by the mobile communication device, and performing the first self-test identified by the first self-test manifest by the mobile communication device. The method further comprises transmitting the results of the first self-test by the mobile communication device via the first communication session to the self-test analysis server and after transmitting the results of the first self-test, receiving a second self-test manifest by the mobile communication device via the first communication session from the self-test analysis server, where the second self-test manifest identifies a second self-test to be performed by the mobile communication device and identifies a time for the mobile communication device to open a second communication session that takes into consideration a network traffic load monitored by the self-test analysis server. The method further comprises performing the second self-test identified by the second self-test manifest by the mobile communication device, transmitting the results of the second self-test by the mobile communication device via the first communication session to the self-test analysis server, and closing the first communication session by the mobile communication device. The method further comprises establishing by the mobile communication device a second communication session with the self-test analysis server at the time identified by the second self-test manifest for the mobile communication device to open the second communication session, performing a third self-test by the mobile communication device, transmitting the results of the third self-test by the mobile communication device via the second communication session to the self-test analysis server and closing the second communication session by the mobile communication device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A framework for mobile communication device self-testing is disclosed herein. In some embodiments, the framework extends to providing an active troubleshooting facility. The framework comprises a self-testing client application that executes on a mobile communication device in accordance with a self-test manifest provided to the self-test client application from a corresponding self-test analysis server application that executes on a server computer. The self-test manifest configures the self-testing client to initiate a communication connection to the self-test analysis application at a specific time. Before initiating the communication connection, the self-test client determines a current location of the mobile communication device. The self-test client then initiates the communication session with the self-test analysis server application. The self-test analysis server application sends a self-test manifest to the self-test client that defines when the self-test client is to next establish a communication session (e.g., during the next iteration of self-testing) as well as identifies a self-test that the self-test client is to perform on the mobile communication device.

The self-test identified by the manifest may be self-test instructions that are pre-loaded on the mobile communication device. Alternatively, the self-test manifest may further include a set of self-test instructions. In an embodiment, the self-test manifest may comprise a plurality of self-test identities and/or a plurality of sets of self-test instructions. The self-test client executes the identified set of self-test instructions, logs the results, and transmits the results to the self-test analysis server application. After transmitting the results to the self-test analysis server application, the self-test client deletes the logged results.

The self-test analysis server application receives and analyzes the self-test results. In some cases, the self-test analysis server application may take remedial action or command the self-test client to take remedial action on the mobile communication device. In some cases the self-test analysis server application executing on the server may send a second self-test manifest over the communication session already established by the self-test client, based on the analysis of the first set of self-test results. The self-test client may execute the self-test or plurality of self-tests identified in the second self-test manifest, log the results, and transmit the results back to the self-test analysis server application executing on the server. The self-test client may then delete the logged results from executing the self-test or self-tests identified in the second self-test manifest. The self-test analysis server application receives and analyzes the second self-test results and may take remedial action based on the analysis and/or may send yet a third self-test manifest to the self-test client. The succession of sending self-test manifests based on analysis of self-test results received during the current communication session may be referred to as active troubleshooting in some contexts.

The self-test analysis server application sends a notification—for example in a self-test manifest or other communication structure—to the self-test client that identifies when the self-test client should initiate the next communication session. This information may be sent in the first self-test manifest. Alternatively, this information may be sent in the last of a series of self-test manifests, for example a final self-test manifest that contains no identification of a self-test. After receiving the notification of the next time for initiating the communication session, the self-test client may take down or destroy the communication session.

The self-test analysis server application may be interworking with a large number of other self-test clients on different mobile communication devices. The self-test analysis server application may send different self-test identities and different self-test instructions to different mobile communication devices. For example, the self-test analysis server application may send different self-test identities and different self-test instructions to different models of mobile communication devices. For example, the self-test analysis server application may send different self-test identities and different self-test instructions to different instances of the same model of mobile communication devices. Some of the self-test identities and self-test instructions that are sent to mobile communication devices may have the purpose of determining current performance parameters of a selected cell site or of a plurality of selected cell sites. For example, the self-test analysis server application may identify mobile communication devices that are served by the same selected cell site and send self-tests to the self-test clients on those mobile communication devices to test performance of the selected cell site. The self-test analysis server application may be able to command the self-test client to determine its position and establish a communication session on an ad hoc or unscheduled basis.

The self-analysis server application can provide a distribution of different test configurations (e.g., self-test manifests) to mobile communication devices in an area of interest, such that some of those devices could be commanded to execute standard tests to collect standard performance metrics, to build up a baseline for those metrics or to refresh an aged set of baseline metrics. Other mobile communication devices in the area of interest could be instructed to run a variety of different tests to establish other performance metrics. In this way the self-test framework can be used not only to maintain and support individual mobile communication devices or cells but to further contribute to the establishment of the framework through building the baseline metrics.

If a mobile communication device fails to connect to the self-test analysis server application, due to a lack of coverage or other reason, the device logs the failure event (e.g., stores on the device) and transmits the log of the failure event during the next opportunity to connect to the self-test analysis server application. When the mobile communication device is able to connect to the self-analysis server application at a time designated in a self-test manifest, it does not store the self-test results beyond the point in time that it transmits these results to the self-analysis server application. The testing results, generally, can support both monitoring and adapting the wireless communication network as well as monitoring an diagnosing any device specific problems. Device specific problems could be a unique one-of problem for a specific user's phone or it could be a problem of a model of a device.

The self-test framework provides a great deal of flexibility. The self-test analysis server application can send more or fewer self-test identities and sets of self-test instructions to the self-test client based on a current loading of at least a portion of the wireless communication network. The self-test framework promotes dynamic adaptation—active troubleshooting—in real-time based on the results of executing self-test instructions during an on-going self-test iteration, thereby speeding the identification of performance problems, either on the mobile communication device or in the radio access network (RAN). A further advantage is that the self-test framework provides real-time or near real-time self-test results from the mobile communication device to the self-test analysis server application.

Figure 1:
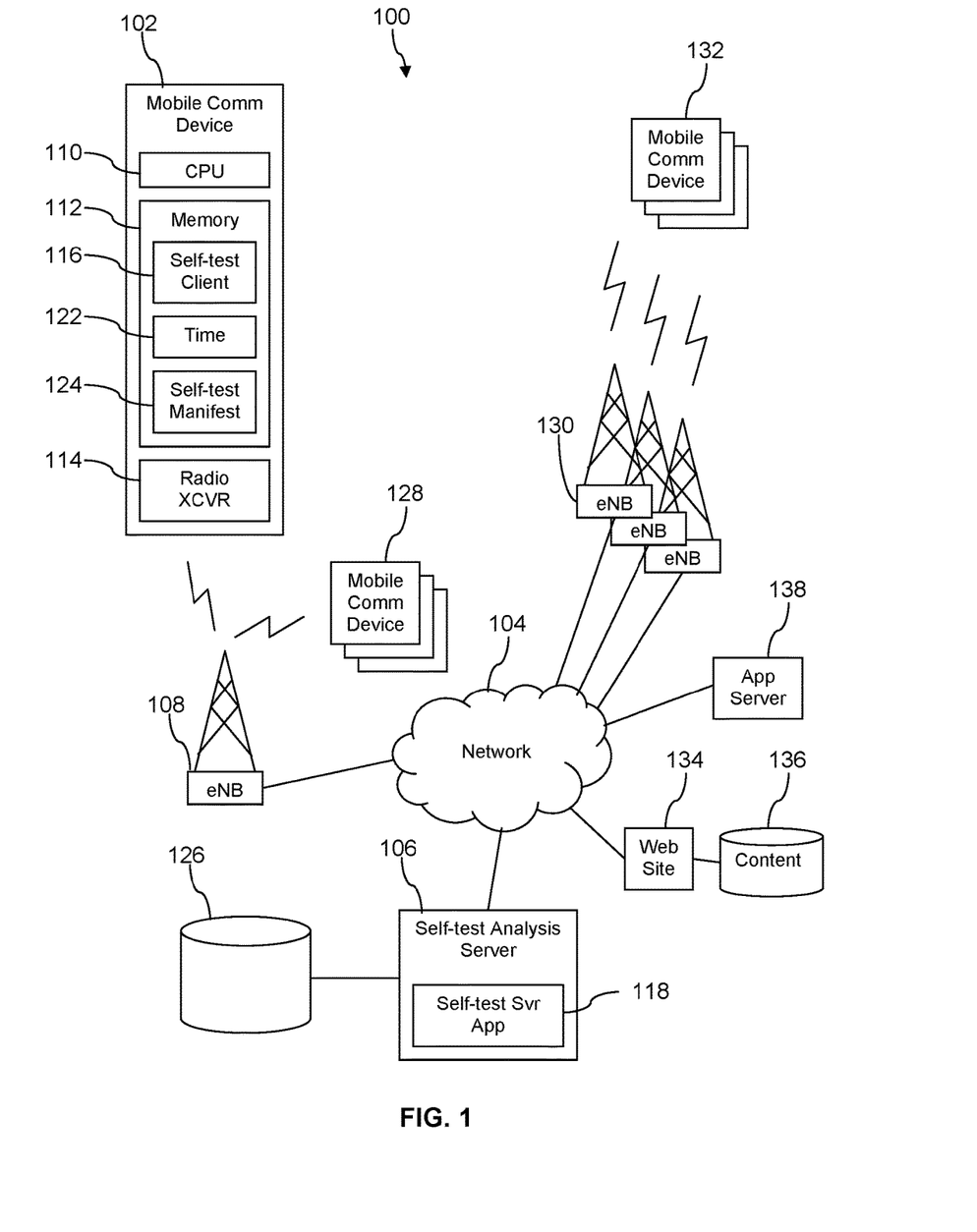
FIG. 1 is a block diagram of a system according to an embodiment of the disclosure.

Turning now to FIG. 1, a system 100 is described. In an embodiment, the system 100 comprises a mobile communication device 102 that communicates via a network 104 with a self-test analysis server 106. The mobile communication device 102 establishes a wireless link with a cell site 108 such as an enhanced node B (eNB) or base transceiver station (BTS) to communicate to the network 104. For example, a radio transceiver 114 of the device 102 establishes a wireless link with the cell site 108 according to a long-term evolution (LTE), a code division multiple access (CDMA), a global system for mobile communications (GSM), or a worldwide interoperability for microwave access (WiMAX) telecommunications protocol or possibly according to a combination of these protocols. The mobile communication device 102 may conduct voice calls and data calls via the cell site 108 and the network 104. For example, the mobile communication device 102 may engage with other mobile communication devices 128 that receive wireless communication links from the cell site 108 and/or with mobile communication devices 132 that receive wireless communication links from cell sites 130. For example the mobile communication device 102 may engage in a data call with a web site 134 to access content 136 or with an application server 138.

The mobile communication device 102 comprises a central processing unit (CPU) 110, a memory 112, and the radio transceiver 114. The memory 112 may comprise both non-transitory memory and transitory memory components. The mobile communication device 102 may be a mobile phone, a personal digital assistant (PDA), a wearable computer, a headset computer, a media player, a laptop computer, a notebook computer, or a tablet computer.

A non-transitory memory component of the memory 112 may store a self-test client 116 that is executed by the CPU 110. The memory 112 may store a time 122 that indicates to the self-test client 116 when to establish a communication session with the self-test analysis server 106 and a self-test analysis server application 118 to perform a self-test. In an embodiment, the time 122 may be indicated to the self-test client 116 by the self-test analysis server application 118 during a previous self-test iteration. The time 122 may be stored in any way in the memory 112. For example, the time 122 may be stored in a memory location in a format indicating a number of seconds after a standard epoch time. The time 122 may be stored in an operating system daemon process such as in a CHRON daemon process. The time 122 may be stored as a count-down interval based on the time provided by the self-test analysis server application 118 during the previous self-test iteration.

The self-test client 116 may perform a self-test cycle based on the time 122. The self-test client 116 may first determine a location of the mobile communication device 102. This may be referred to in some contexts as self-locating. The self-test client 116 may determine its location by requesting and obtaining a GPS location from a GPS receiver (not shown) of the mobile communication device 102. The self-test client 116 may determine its location in another manner, for example using trilateration techniques. Alternatively, the self-test client 116, under some circumstances, may determine its location based on the identity of a last known serving cell, for example under the circumstance that the radio transceiver 114 is out of coverage when the device 102 is inside of a large building.

After determining its position, the self-test client 116 establishes a communication session with the self-test analysis server 106 and the self-test analysis server application 118 via the cell site 108 and via the network 104. The self-test client 116 desirably establishes the communication session within a predefined threshold of time after self-locating so that the location information remains accurate. The predefined threshold of time may be about 10 seconds, about 1 minute, about 5 minutes, or some other period of time.

In response to the self-test client 116 establishing the communication session, the self-test analysis server application 118 creates a self-test manifest 124 that it transmits to the self-test client 116 via the network 104 and the cell site 108. The self-test manifest 124 may be stored in memory 112 at least temporarily. The self-test manifest 124 provides information that the mobile communication device 102 uses to conduct a self-test procedure.

Figure 2:
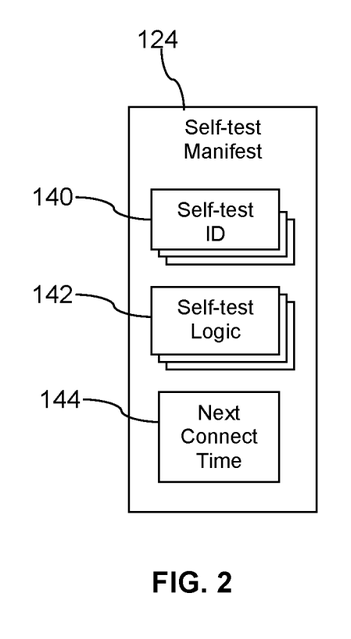
FIG. 2 is a block diagram of a self-test manifest according to an embodiment of the disclosure.

Turning now to FIG. 2, details of the self-test manifest 124 are described. It is understood that in different embodiments, and in one embodiment but under different conditions, some of the contents of the self-test manifest 124 may be different. In an embodiment, the self-test manifest 124 comprises one or more self-test identities 140, one or more self-test logic blocks 142, and a next connect time. The self-test identity 140 identifies a self-test to be performed, for example a self-test embodied in one of the self-test logic blocks 142 or one of a self-test logic block that may be preloaded into the memory 112 of the mobile communication device 102. Self-test logic blocks 142 may be preloaded into the memory 112 during original manufacturing or during a maintenance release (MR) of the mobile communication device 102. Alternatively, self-test logic blocks 142 may be preloaded into the memory 112 by a previously downloaded self-test manifest 124 that was received by the mobile communication device 102. Said in other words, in an embodiment, a first self-test manifest 124 sent to the mobile communication device 102 may comprise self-test logic blocks 142 that are stored and retained in the memory 112 of the mobile communication device 102 for use in later self-test operations during the same self-test cycle and during the same communication session or for use in later self-test operations during different self-test cycles and during different communication sessions.

The next connect time 144 may identify a time at which the mobile communication device 102 is requested to initiate the next self-test cycle and/or to open the next communication session with the self-test analysis server 106. The next connect time 144 may identify an elapsed time after which the mobile communication device 102 is requested to initiate the next self-test cycle and/or to open the next communication session with the self-test analysis server 106. Some self-test manifests 124 may not comprise the next connect time 144, for example when a plurality of self-test manifests 124 are sent to the mobile communication device 102 during the same self-test cycle. When a plurality of self-test manifests 124 are sent to the mobile communication device 102, the next connect time 144 may be sent only in the first self-test manifest 124, only in the last self-test manifest 124, or only in an intermediate self-test manifest 124.

Now with reference to both FIG. 1 and FIG. 2, further details of the system 100 are described. The self-test client 116, having received the self-test manifest 124 from the self-test analysis server application 118 over the communication session, executes one or more self-test logic blocks 142 that are identified in the self-test manifest 124. The self-test logic blocks 142 may comprise a firmware or software file to be executed. The self-test logic blocks 142 may comprise an executable script to execute. The self-test logic blocks comprise instructions that may be executable by the CPU 110 of the mobile communication device 102. The self-test client 116 captures the results of executing the self-test logic blocks 142 on the mobile communication device 102 and logs the results. The self-test client 116 then transmits the logged results of executing the self-test logic blocks 142 over the communication session to the self-test analysis server application 118. When the self-test client 116 transmits logged results for the first time during a self-test cycle, it also transmits the location of the mobile communication device 102 determined shortly before establishing the communication session between the device 102 and the Self-test analysis server 106.

The self-test analysis server application 118 stores the logged self-test results in the data store 126 and analyzes the logged self-test results. The analysis may conclude that the mobile communication device 102 and/or the radio access network (e.g., the cell sites 108, 130) are operating within nominal performance standards. In this case, the self-test analysis server application 118 may close the communication session with the mobile communication device 102. Alternatively, the self-test analysis server application 118 sends a message to the self-test client 116 instructing it to close the communication session.

In some cases, however, the analysis may conclude that one or the other of the mobile communication device 102 or the radio access network is not operating within nominal performance standards. In this case the self-test analysis server application 118 may take remedial action. Remedial action may include pushing a software update to the mobile communication device 102, for example sending new preferred roaming lists (PRLs) or other radio access network lists of serving cell towers to the mobile communication device 102. Remedial action may include adjusting cell site power amplifier settings (change radio transmission power settings), adjusting antenna tilt angles, and the like. In some cases, remedial action may be identifying a coverage hole and determining to build a new cell site to fill the coverage hole. In some cases, remedial action may be identifying and reducing a cell site overshoot, where an overshoot is where the radio signal of a cell site overlaps undesirably into a coverage area of a neighboring cell site.

In some cases, based on the analysis, the self-test analysis server application 118 may transmit an additional self-test manifest 124 to the mobile communication device 102, and the self-test client 116, in response to receiving the additional self-test manifest 124, may perform additional self-tests, as identified in the additional self-test manifest 124, and send the logged self-test results of the additional self-tests to the self-test analysis server application 118 over the communication session. The self-test analysis server application 118 may in turn analyze the results of the additional self-test results to determine further steps to take. The self-test analysis server application may complete any number of iterations of sending a self-test manifest, receiving logged self-test results, analyzing the self-test results, and taking action during a single on-going communication session or a single on-going self-test cycle.

The opportunity to analyze results of one self-test iteration and use the analysis results to adaptively send a follow-up self-test manifest and thereby command additional self-testing by the mobile communication device 102 can be referred to as active troubleshooting. This active troubleshooting can effectively and promptly converge on a source of a communication problem and fix it in some instances. The self-test analysis server application 118 can identify additional self-tests to execute based on the specific results of previous self-tests conducted by the self-test client 116 on the mobile communication device 102 and include self-test logic blocks 142 for those additional self-tests in the follow-up self-test manifest sent to the device 102. In some cases, the self-test analysis server application 118 may add self-test iterations when network conditions are suitable, for example when network traffic is very low. In this case, the self-test analysis server application 118 may request further self-test iterations that promote collecting performance metrics that can be used to establish performance norms for the cell site 108, for the mobile communication device 102, or for a model of mobile communication device.

In an embodiment, the self-test analysis server application 118 may send a time of next connection 122 to the mobile communication device 102 that causes the self-test client 116 to establish the communication session with the self-test analysis server 106 about every 10 minutes, about every 15 minutes, about every 20 minutes, or about every 30 minutes, about every hour. The self-test analysis server application 118 may send a time of next connection 122 to the mobile communication device 102 that makes the time between self-test cycles either greater or lesser based on current network traffic conditions in the general area where the mobile communication device 102 is located. Said in other words, the self-test analysis server application 118 may monitor network traffic volume or network traffic load and create, build, and/or adapt the self-test manifest 124 accordingly.

Sometimes the self-test analysis server application 118 may interleave self-test cycles of different mobile communication devices 102 attached to the same cell sites 108 or that are located in the same area of the radio access network, whereby reducing the burden on the network traffic of self-testing communications. For example, the self-test analysis server application 118 may send a time of next connection 122 to a first device 102 for 2 PM, send a time of next connection 122 to a second device 102 for 2:15 PM, send a time of next connection 122 to a third device 102 for 2:30 PM, and send a time of next connection 122 to the first device 102 for 2:45 PM, and so forth, interleaving time of next connection 122 to reduce traffic on the network 104 or in the radio access network.

The self-test results collected from different mobile communication devices 102 may be analyzed by the self-test analysis server 106 to determine performance norms for the devices 102. These norms may be determined across the all devices 102 or across a subset of all devices 102. For example, a first performance norm may be determined for all devices 102 that are used in a first region, a second performance norm may be determined for all devices 102 that are used in a second region, and a third performance norm may be determined for all devices 102 that are used in a third region. Alternatively, a fourth performance norm may be determined for a first model of the device 102, a fifth performance norm may be determined for a second model of the device 102, and a sixth performance norm may be determined for a third model of the device 102. The performance norms may be used by the self-test analysis server 106 to evaluate the results transmitted from the devices 102 to the self-test analysis server 106. The self-test analysis server 106 may use the performance norms, at least in part, to create and build the self-test manifests, for example in combination with analysis of a set of logged self-test results previously received from the subject mobile communication device 102. In an embodiment, the self-test analysis server 106 may create and adapt self-test manifests for different mobile communication devices 102, for example devices of the same model type or located in the same region, in part to collect and build a set of performance metrics to promote determination of representative performance norms.

The self-tests performed by the self-test client 116 and encoded by the self-test logic blocks 142 may be any self-tests that can execute on the mobile communication device 102. The self-tests may comprise a downlink throughput test, an uplink throughput test, or an up and down latency test. The self-tests may include collecting a set of radio access network signal strength metrics. The self-tests may include collection a set of signal-to-noise ratios (SNR) metrics. The self-tests can include other tests.

In some circumstances the radio transceiver 114 may not be able to establish a communication session with the self-test analysis server 106, for example when the mobile communication device 102 is located in a coverage hole or is out of a coverage area (e.g., a user of the mobile communication device is traveling away from a region of ubiquitous coverage, for example into a mountain wilderness area). Under this circumstance, the self-test client 116 can log and store data recording the failure to establish the communication session. When the radio transceiver 114 enters coverage of a cell site 108 again, the self-test client 116 may establish a communication session at an ad hoc time (e.g., at a time not defined by the time 122) and transmit the data about the coverage outage. The self-test analysis server 106 may be able to take corrective action to improve wireless communication service to the subject mobile communication device 102 (as well as improve service for other devices) based on both the transmitted logged results and based on the transmitted logged failure.

The self-test manifest 124 may be retained and stored on the mobile communication device 102 and the self-test client 116 may perform and re-perform the same self-tests over a plurality of self-test cycles. For example, the self-test analysis server application 118 may transmit a self-test manifest upon establishment of the communication session with the device 102 that only identifies the next connection time 144 for the device 102. Under this circumstance, it is understood that the mobile communication device 102 is to perform the self-tests identified in the most recent self-test manifest 124 that identified self-tests. The self-test client 116 can also determine mobile application loading on the mobile communication device 102 and provide metrics on that mobile application loading to the self-test analysis server application 118. For example, the amount of CPU utilization presented by one or more mobile applications on the device 102 may be determined by the self-test client 116 and reported with the self-test results to the self-test analysis server application 118. The self-test client 116 may determine and report to the self-test analysis server application 118 the amount of data communication traffic presented by execution of mobile applications executing on the device 102.

Figure 3:
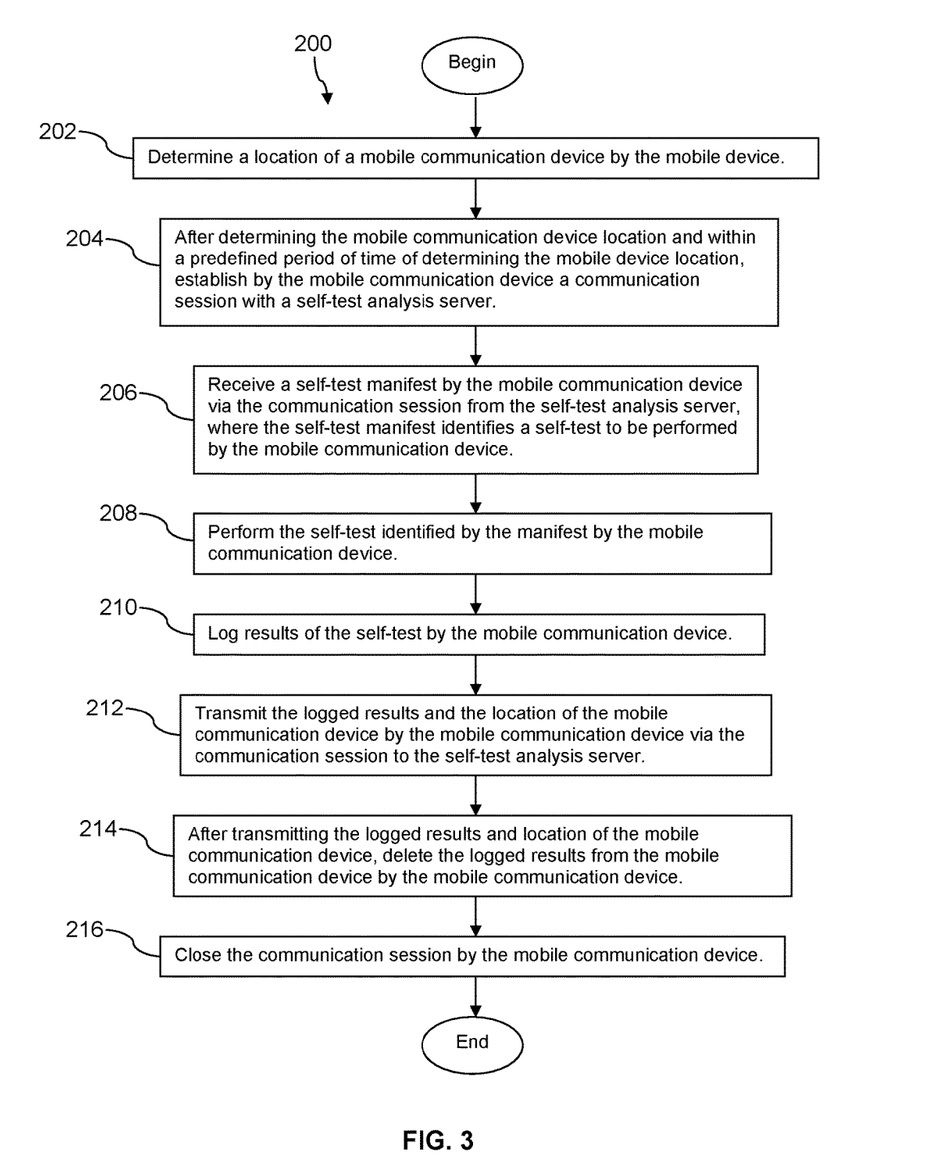
FIG. 3 is a flow chart of a method according to an embodiment of the disclosure.

Turning now to FIG. 3, a method 200 is described. Method 200 may be performed by the mobile communication device 102, for example by the self-test client application 116 executing on the CPU 110. At block 202, determine a location of a mobile communication device by the mobile device. At bock 204, after determining the mobile communication device location and within a predefined period of time of determining the mobile device location, establish by the mobile communication device a communication session with a self-test analysis server. At block 206, receive a self-test manifest by the mobile communication device 102 via the communication session from the self-test analysis server, where the self-test manifest identifies a self-test to be performed by the mobile communication device. The self-test manifest may be created by a server computer (e.g., by the self-test analysis server application 118 executing on the self-test analysis server 106) based on performance norms determined by the server computer based on analyzing logged self-test results collected from other mobile communication devices and based on logged self-test results previously collected from the mobile communication device.

At block 208, perform the self-test identified by the manifest by the mobile communication device. At block 210, log results of the self-test by the mobile communication device. At block 212, transmit the logged results and the location of the mobile communication device by the mobile communication device via the communication session to the self-test analysis server. At block 214, after transmitting the logged results and location of the mobile communication device, delete the logged results from the mobile communication device by the mobile communication device. At block 216, close the communication session by the mobile communication device.

The processing of blocks 202 through 216 may be repeated periodically or occasionally by the mobile communication device 102. Some of the processing blocks may be repeated before passing on to performing later blocks. For example, the processing of blocks 206, 208, 210, 212, and 214 may be repeated multiple times before passing on to process block 216. In some cases, the processing self-test performed in block 208 may be defined or identified in a previously received manifest.

Figure 4A:
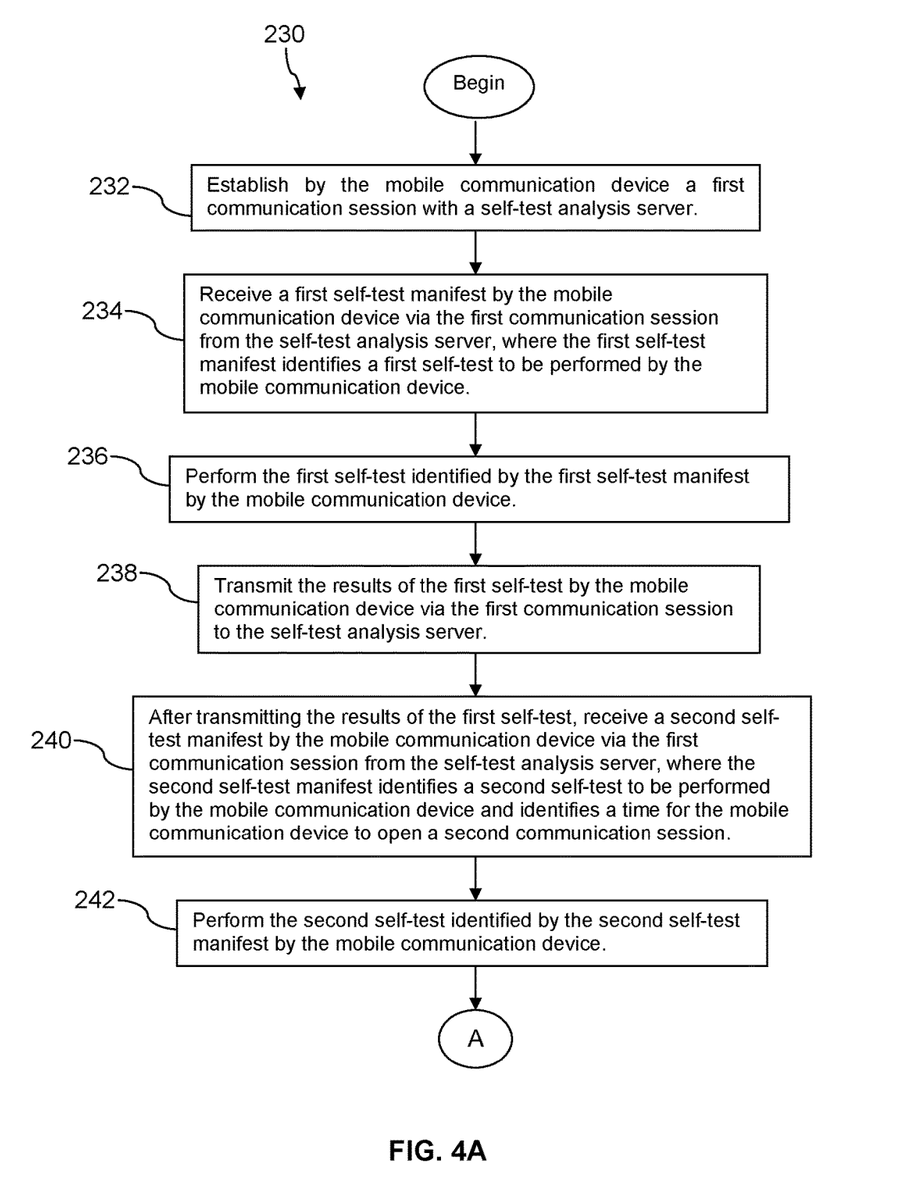
FIG. 4A and FIG. 4B are a flow chart of another method according to an embodiment of the disclosure.
Figure 4B:
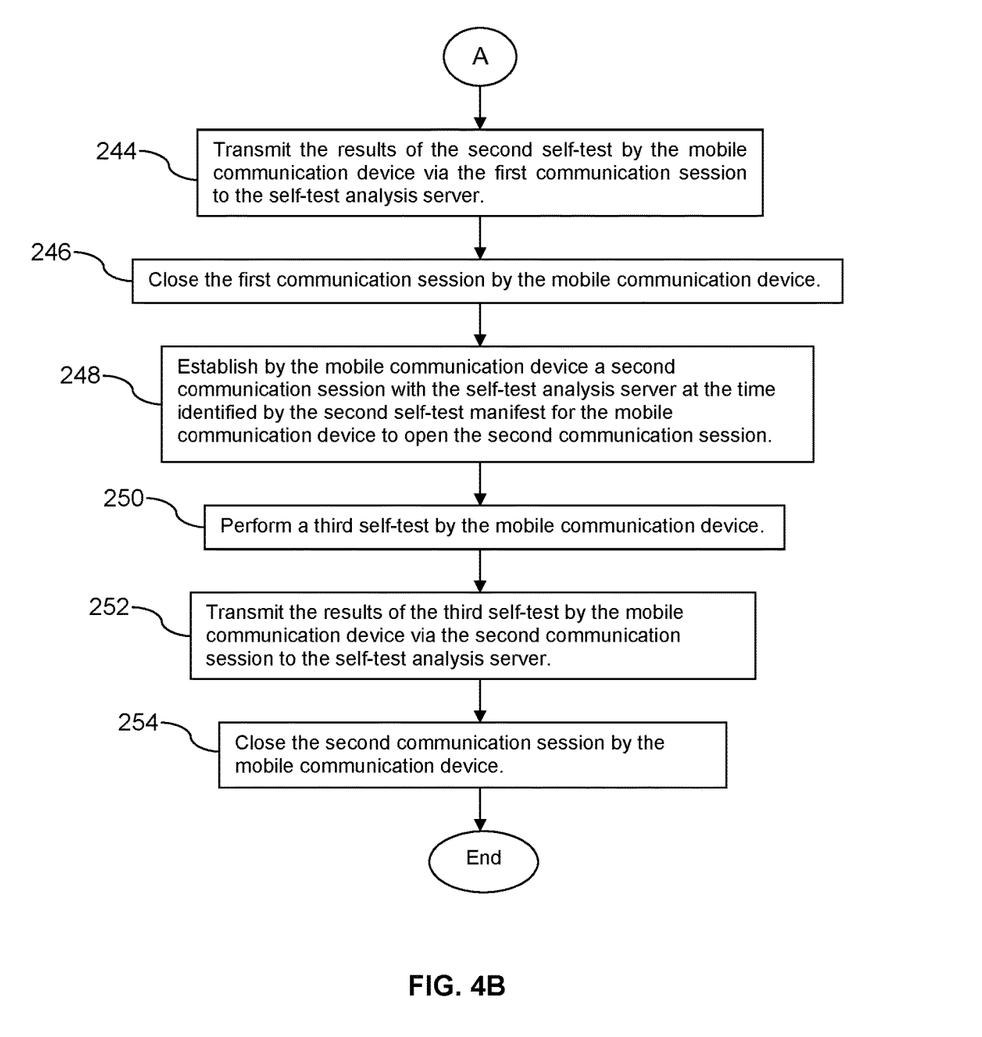

Turning now to FIG. 4A and FIG. 4B, a method 230 is described. The processing of method 230 may be performed on the mobile communication device 102 for example at least in part by the self-test client application 116. At block 232, establish by the mobile communication device a first communication session with a self-test analysis server. At block 234, receive a first self-test manifest by the mobile communication device via the first communication session from the self-test analysis server, where the first self-test manifest identifies a first self-test to be performed by the mobile communication device. At block 236, perform the first self-test identified by the first self-test manifest by the mobile communication device. Performing the first self-test may comprise executing instructions included in a first self-test logic block stored in a non-transitory portion of the memory 112. Alternatively, performing the first self-test may comprise executing instructions included in a first self-test logic block that was included in a previously received and stored self-test manifest (e.g., previous to the current communication session). Alternatively, performing the first self-test may comprise executing instructions included in a first self-test logic block that is included in the first self-test manifest that is received during the current communication session.

At block 238, transmit the results of the first self-test by the mobile communication device via the first communication session to the self-test analysis server. At block 240, after transmitting the results of the first self-test, receive a second self-test manifest by the mobile communication device via the first communication session from the self-test analysis server, where the second self-test manifest identifies a second self-test to be performed by the mobile communication device and identifies a time for the mobile communication device to open a second communication session. The second self-test manifest takes into consideration a network traffic load monitored by the self-test analysis server. For example the second self-test manifest specifies a next connection time that is either later or earlier in time based on network traffic loads being heavier or lighter, respectively.

At block 242, perform the second self-test identified by the second self-test manifest by the mobile communication device. At block 244, transmit the results of the second self-test by the mobile communication device via the first communication session to the self-test analysis server. At block 246, close the first communication session by the mobile communication device. At block 248, establish by the mobile communication device a second communication session with the self-test analysis server at the time identified by the second self-test manifest for the mobile communication device to open the second communication session.

At block 250, perform a third self-test by the mobile communication device. At block 252, transmit the results of the third self-test by the mobile communication device via the second communication session to the self-test analysis server. At block 254, close the second communication session by the mobile communication device.

Figure 5:
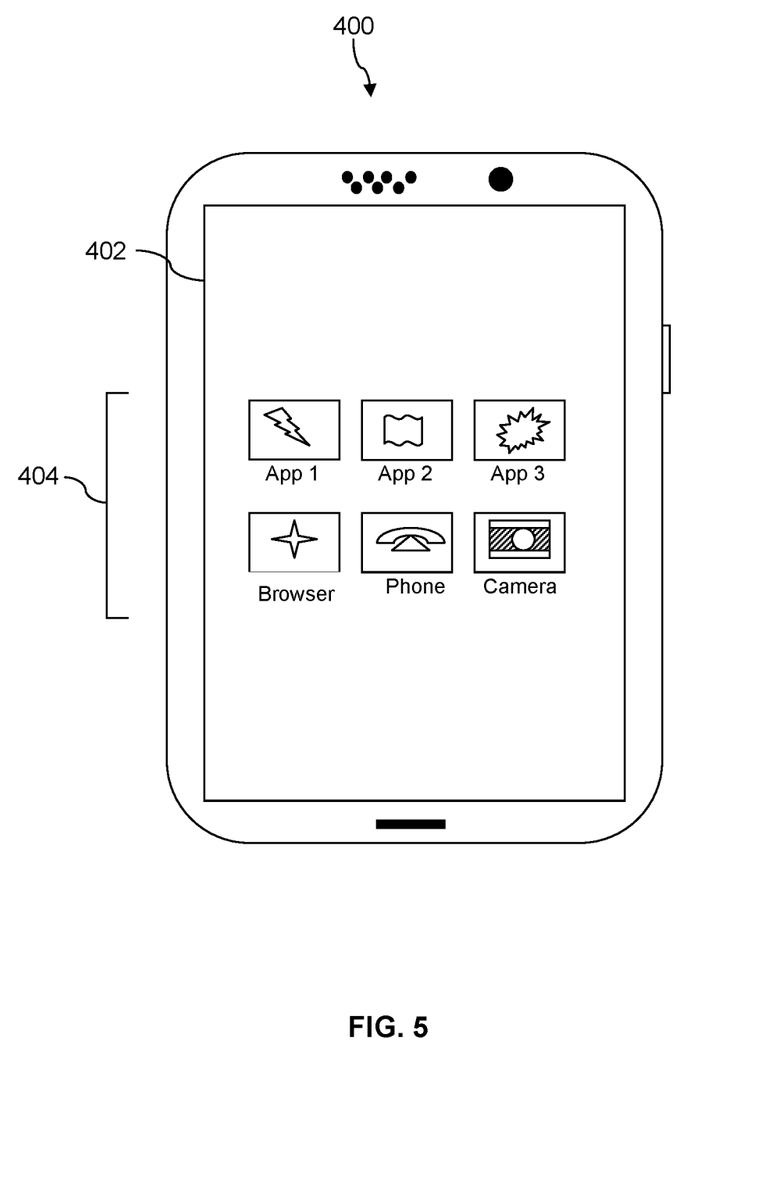
FIG. 5 is an illustration of a mobile communication device according to an embodiment of the disclosure.

FIG. 5 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 6:
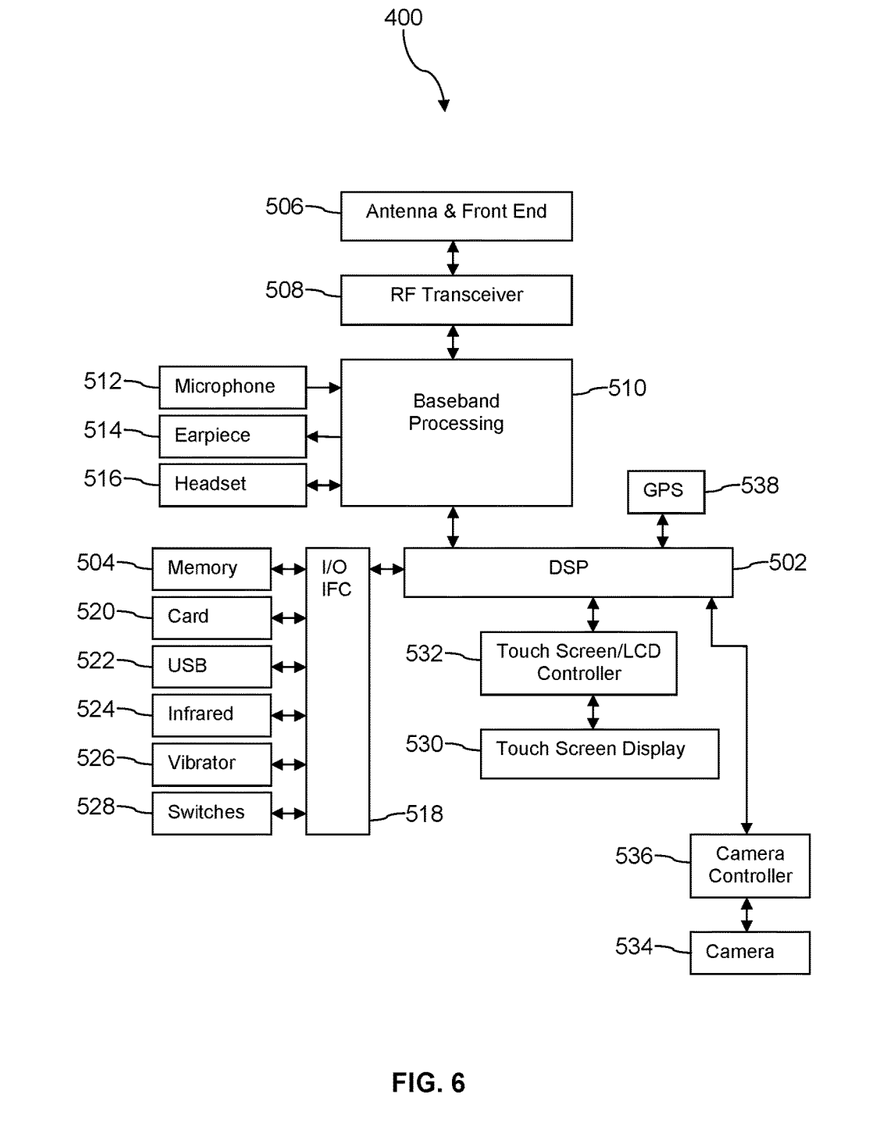
FIG. 6 is a block diagram of a hardware architecture of a mobile communication device according to an embodiment of the disclosure.

FIG. 6 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 7A:
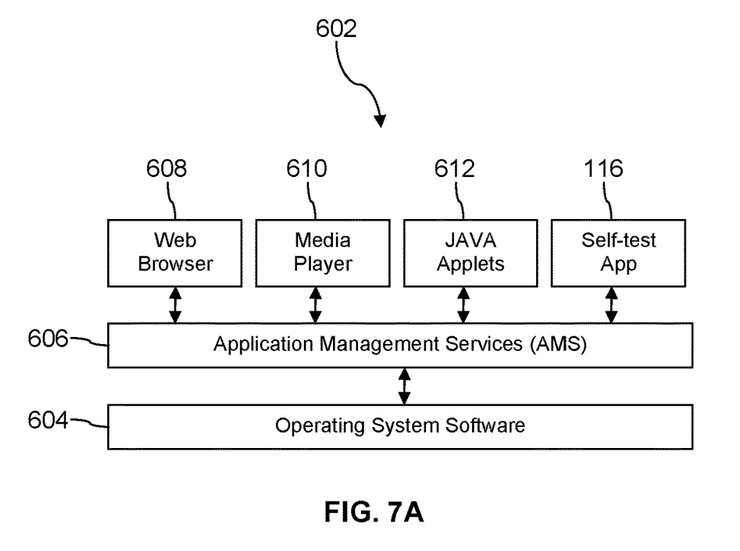
FIG. 7A is a block diagram of a software architecture of a mobile communication device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications (e.g. the self-test client application 116) running on the UE 400. Also shown in FIG. 7A are a web browser application 608, a media player application 610, and JAVA applets 612. In an embodiment, a third party application 614 may be installed on the mobile communication device 400. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 7B:
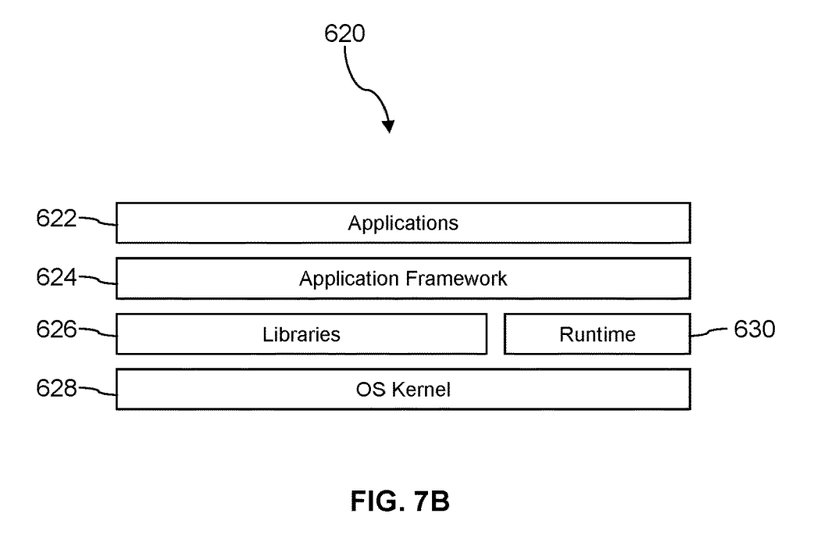
FIG. 7B is a block diagram of another software architecture of a mobile communication device according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
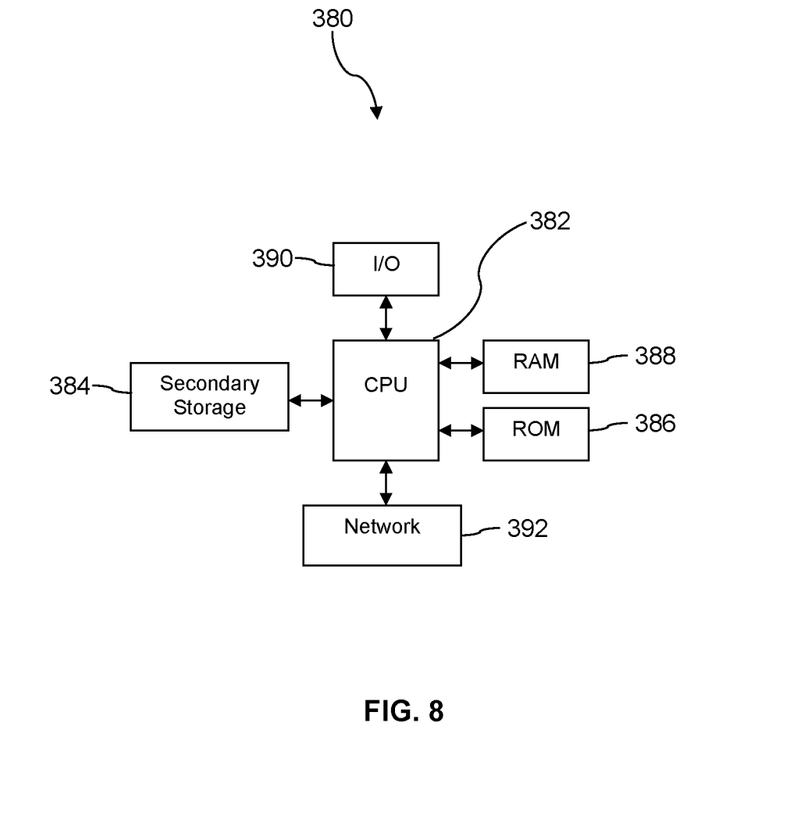
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and self-tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embedded in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of a mobile communication device performing self-testing, comprising:
    determining, by the mobile communication device, a location of the mobile communication device;
    after determining the mobile communication device location and within a predefined period of time of determining the mobile device location, establishing, by the mobile communication device, a communication session with a self-test analysis server, wherein the mobile communication device establishes the communication session with the self-test analysis server based at least partially on contents of a previously received self-test manifest specifying a specific time for the mobile communication device to establish the communication session with the self-test analysis server;
    receiving, by the mobile communication device via the communication session from the self-test analysis server, a self-test manifest identifying a self-test to be performed by the mobile communication device and a specific point in time for the mobile communication device to establish another communication session with the self-test analysis server, the self-test manifest created by a server computer based on performance norms determined by the server computer based on analyzing logged self-test results collected from other mobile communication devices and based on logged self-test results previously collected from the mobile communication device;
    performing the self-test identified by the manifest by the mobile communication device;
    logging results of the self-test by the mobile communication device;
    transmitting the logged results and the location of the mobile communication device by the mobile communication device via the communication session to the self-test analysis server;
    after transmitting the logged results and location of the mobile communication device, deleting the logged results from the mobile communication device by the mobile communication device; and
    closing the communication session by the mobile communication device,
    whereby a remedial action is identified and performed.

2. The method of claim 1, wherein the self-test to be performed is a downlink throughput test, an uplink throughput test, or an up and down latency test.

3. The method of claim 1, wherein the self-test to be performed comprises collecting a set of network signal strength metrics by the mobile communication device or collecting a set of signal-to-noise ratio (SNR) metrics by the mobile communication device.

4. The method of claim 1, wherein the remedial action is adjusting a power amplifier at a cell site, adjusting an antenna tilt at a cell site, or building a new cell site.

5. The method of claim 1, wherein determining the location of the mobile communication device is accomplished by obtaining global positioning system (GPS) coordinates from a GPS receiver of the mobile communication device.

6. The method of claim 1, wherein the self-test manifest is created by the server computer further based on a network traffic load.

7. The method of claim 1, wherein the mobile communication device establishes the communication session with the self-test analysis server at a time that is defined in a previously received self-test manifest.

8. A mobile communication device that performs self-testing, comprising:
    a radio transceiver;
    a non-transitory memory;
    a processor; and
    a self-testing application stored in the non-transitory memory that, when executed by the processor;
        establishes a communication session via the radio transceiver with a self-test analysis server, wherein the mobile communication device establishes the communication session with the self-test analysis server based at least partially on contents of a previously received self-test manifest specifying a specific time for the mobile communication device to establish the communication session with the self-test analysis server,
        receives a self-test manifest via the communication session from the self-test analysis server, the self-test manifest identifying a self-test to be performed by the mobile communication device and a specific point in time for the mobile communication device to establish another communication session with the self-test analysis server,
        performs the self-test identified by the manifest,
        logs results of the self-test, transmits the logged results via the communication session to the self-test analysis server, closes the communication session, after closing the communication session, attempts to establish a second communication session via the radio transmitter with the self-test analysis server according to the specific point in time indicated in the self-test manifest, logs a failure to establish the second communication session, after logging the failure to establish the second communication session and after delaying a predefined duration of time since the failure, establishes a third communication session via the radio transceiver with the self-analysis server, and transmits the logged failure to the self-analysis server via the third communication session, whereby the self-test analysis server is able to take corrective action to improve wireless communication service to the mobile communication device based both on transmitted logged results and based on the transmitted logged failure.

9. The mobile communication device of claim 8, wherein the mobile communication device is a mobile phone, a personal digital assistant (PDA), a wearable computer, a headset computer, a media player, a laptop computer, a notebook computer, or a tablet computer.

10. The mobile communication device of claim 8, wherein the radio transceiver is configured to establish a wireless communication link with a cell site according to a long-term evolution (LTE), a code division multiple access (CDMA), a global system for mobile communications (GSM), or a worldwide interoperability for microwave access (WiMAX) telecommunications protocol.

11. The mobile communication device of claim 8, wherein the self-testing application establishes the communication session with the test analysis server within 1 minute of determining the location of the mobile communication device.

12. The mobile communication device of claim 8, wherein the self-test analysis server performs a remedial action selected from a group consisting of adjusting a power amplifier at a cell site, adjusting an antenna tilt at a cell site, building a new cell site, or reducing a cell site overshoot.

13. The mobile communication device of claim 8, where the self-testing application establishes the communication session with the test analysis server at a time identified in a self-test manifest received from the self-test analysis server prior to the current communication session.

14. The mobile communication device of claim 8, where the self-test manifest comprises self-test logic blocks and where performing the self-test identified by the self-test manifest comprises executing a plurality of instructions included by the self-test logic blocks.

15. A method of performing mobile communication active troubleshooting, comprising:

establishing by the mobile communication device a first communication session with a self-test analysis server, wherein the mobile communication device establishes the first communication session with the self-test analysis server based at least partially on contents of a previously received self-test manifest specifying a specific time for the mobile communication device to establish the first communication session with the self-test analysis server;

receiving a first self-test manifest by the mobile communication device via the first communication session from the self-test analysis server, the first self-test manifest identifying a first self-test to be performed by the mobile communication device;

performing the first self-test identified by the first self-test manifest by the mobile communication device;

transmitting the results of the first self-test by the mobile communication device via the first communication session to the self-test analysis server;

after transmitting the results of the first self-test, receiving a second self-test manifest by the mobile communication device via the first communication session from the self-test analysis server, where the second self-test manifest identifies a second self-test to be performed by the mobile communication device and identifies a specific time for the mobile communication device to open a second communication session that takes into consideration a network traffic load monitored by the self-test analysis server;

performing the second self-test identified by the second self-test manifest by the mobile communication device;

transmitting the results of the second self-test by the mobile communication device via the first communication session to the self-test analysis server;

closing the first communication session by the mobile communication device;

establishing by the mobile communication device a second communication session with the self-test analysis server at the specific time identified by the second self-test manifest for the mobile communication device to open the second communication session;

performing a third self-test by the mobile communication device;

transmitting the results of the third self-test by the mobile communication device via the second communication session to the self-test analysis server; and closing the second communication session by the mobile communication device.

16. The method of claim 15, wherein the mobile communication device is a mobile phone, a personal digital assistant (PDA), a wearable computer, a headset computer, a media player, a laptop computer, a notebook computer, or a tablet computer.

17. The method of claim 15, wherein the third test is identified in the first self-test manifest or the second self-test manifest which is stored in the mobile communication device during the first communication session.

18. The method of claim 15, wherein performing the first self-test identified in the first self-test manifest comprises executing a first plurality of instructions included in a first self-test logic block, where the first self-test logic block is stored in the mobile communication device before establishing the first communication session.

19. The method of claim 15, wherein the first self-test manifest comprises a second self-test logic block including a second plurality of instructions and wherein performing the first self-test identified in the first self-test manifest comprises executing the second plurality of instructions.

20. The method of claim 15, wherein the second self-test manifest comprises a third self-test logic block including a third plurality of instructions and wherein performing the second self-test identified in the second self-test manifest comprises executing the third plurality of instructions.

* * * * *